(12) United States Patent
Modak et al.

(10) Patent No.: US 8,903,773 B2
(45) Date of Patent: Dec. 2, 2014

(54) COMPUTER FILE STORAGE, BACKUP, RESTORE AND RETRIEVAL

(75) Inventors: Sachin Modak, Simi Valley, CA (US); Michael Andrews, Simi Valley, CA (US); Nathan Fouarge, Oak Park, CA (US)

(73) Assignee: NovaStor Corporation, Agoura Hills, CA (US)

( * ) Notice: Subject to any disclaimer, the term of this patent is extended or adjusted under 35 U.S.C. 154(b) by 584 days.

(21) Appl. No.: 12/751,349

(22) Filed: Mar. 31, 2010

(65) Prior Publication Data

US 2011/0246427 A1    Oct. 6, 2011

(51) Int. Cl.
*G06F 17/30* (2006.01)
*G06F 11/14* (2006.01)

(52) U.S. Cl.
CPC ........ *G06F 11/1469* (2013.01); *G06F 11/1451* (2013.01); *G06F 11/1464* (2013.01)
USPC ....................................................... 707/653

(58) Field of Classification Search
CPC .................................................. G06F 11/1469
USPC .................................. 707/640, 661, 674, 653
See application file for complete search history.

(56) References Cited

U.S. PATENT DOCUMENTS

| | | | |
|---|---|---|---|
| 6,230,190 B1 | 5/2001 | Edmonds et al. | |
| 6,640,217 B1 | 10/2003 | Scanlan et al. | |
| 7,054,910 B1 | 5/2006 | Nordin et al. | |
| 7,398,286 B1 | 7/2008 | Stockenberg et al. | |
| 7,483,929 B2 | 1/2009 | Kulkarni et al. | |
| 2002/0194535 A1 | 12/2002 | Largman et al. | |
| 2003/0018657 A1 | 1/2003 | Monday | |
| 2003/0187853 A1 | 10/2003 | Hensley et al. | |
| 2004/0073677 A1 | 4/2004 | Honma et al. | |
| 2004/0167942 A1 | 8/2004 | Oshinsky et al. | |
| 2006/0031540 A1 | 2/2006 | Purontaus et al. | |
| 2006/0036895 A1 | 2/2006 | Henrickson | |
| 2006/0179083 A1 | 8/2006 | Kulkarni et al. | |
| 2006/0242273 A1 | 10/2006 | Fiducci | |
| 2008/0126442 A1* | 5/2008 | Cisler et al. | 707/204 |
| 2009/0055407 A1 | 2/2009 | Oshinsky et al. | |

OTHER PUBLICATIONS

Yuichi Koike, et al., TimeSlider: An interface to specify time point, Proceedings of User Interface and Software Technology 1997 Banff, Alberta, Canada (UIST 97), ACM Press, 43-44.
Apple.com, Mac 101: Time Machine, Article: HT1427, Last Modified: Jan. 30, 2010, accessed Mar. 23, 2010, pp. 1-5, http://support.apple.com/kb/HT1427?viewlocale=en_US.

(Continued)

*Primary Examiner* — Huawen Peng
(74) *Attorney, Agent, or Firm* — SoCal IP Law Group LLP; Mark A. Goldstein

(57) ABSTRACT

Computer file storage, backup, restore and retrieval is disclosed. A method includes providing a restore file interface allowing a user to restore a plurality of files based on a plurality of filter options, the files stored on multiple local and/or remote storage devices, computing devices, servers, and clouds. A filter option selection is received from the user, and filter details may also be received from the user. An available file list may be prepared based on the filter option selection and, if received, the filter details. A user selection from the available file list may be received. The user selected files are retrieved from one or more appropriate storage devices, computing devices, servers, and clouds. The method may be performed by software executing on a computing device.

29 Claims, 7 Drawing Sheets

© 2010 NovaStor Corp.

(56) References Cited

OTHER PUBLICATIONS

John Siracusa, Mac OS X 10.5 Leopard: the Ars Technica review, Last Update Oct. 29, 2007, pp. 1-11, accessed Mar. 23, 2010, http://arstechnica.com/apple/reviews/2007/10/mac-os-x-10-5.ars/14.

Paul Rubens, Say 'Cheese': OpenSolaris' Time Slider, Article, Jul. 27, 2009, pp. 1-3, accessed Mar. 23, 2010, http://www.serverwatch.com/tutorials/article.php/3831881/Say-Cheese-OpenSolaris-Time-Slider.htm.

Geertjan Wielenga, Time Slider: OpenSolaris 2008.11 Killer Feature, Article submitted on Dec. 3, 2008, pp. 1-6, accessed Mar. 23, 2010, http://java.dzone.com/news/killer-feature-opensolaris-200.

A. Bashi, TimeVault, Article, created Jun. 9, 2007, pp. 1-8, accessed Mar. 23, 2010, https://launchpad.net/timevault.

Christopher Ahlberg et al., The Alphaslider: A Compact and Rapid Selector, Human Factors in Computing Systems, Article, Apr. 1994, College Park, Maryland, pp. 365-371.

* cited by examiner

COMPUTER FILE STORAGE, BACKUP, RESTORE AND RETRIEVAL

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure, as it appears in the Patent and Trademark Office patent files or records, but otherwise reserves all copyright and trade dress rights whatsoever.

BACKGROUND

1. Field

This disclosure relates to backup, storing, restoring and retrieval of computer files from multiple locations.

2. Related Art

Computer backups are an important tool available to computer users. Computer backups allow a computer user to recover from disk failures and human errors such as unintentional deletion of files. The backups may be stored locally on an attached backup device or over a network to a local or remote device connected over a local area network or wide area network. The backup files may be retrieved from an attached backup device or over a network from a local or remote device or server connected over a local area network or wide area network.

DETAILED DESCRIPTION

Described herein are a system and method that allow for retrieval and/or restoration of backed up or stored files or groups of files from multiple backup locations.

Figure 1:
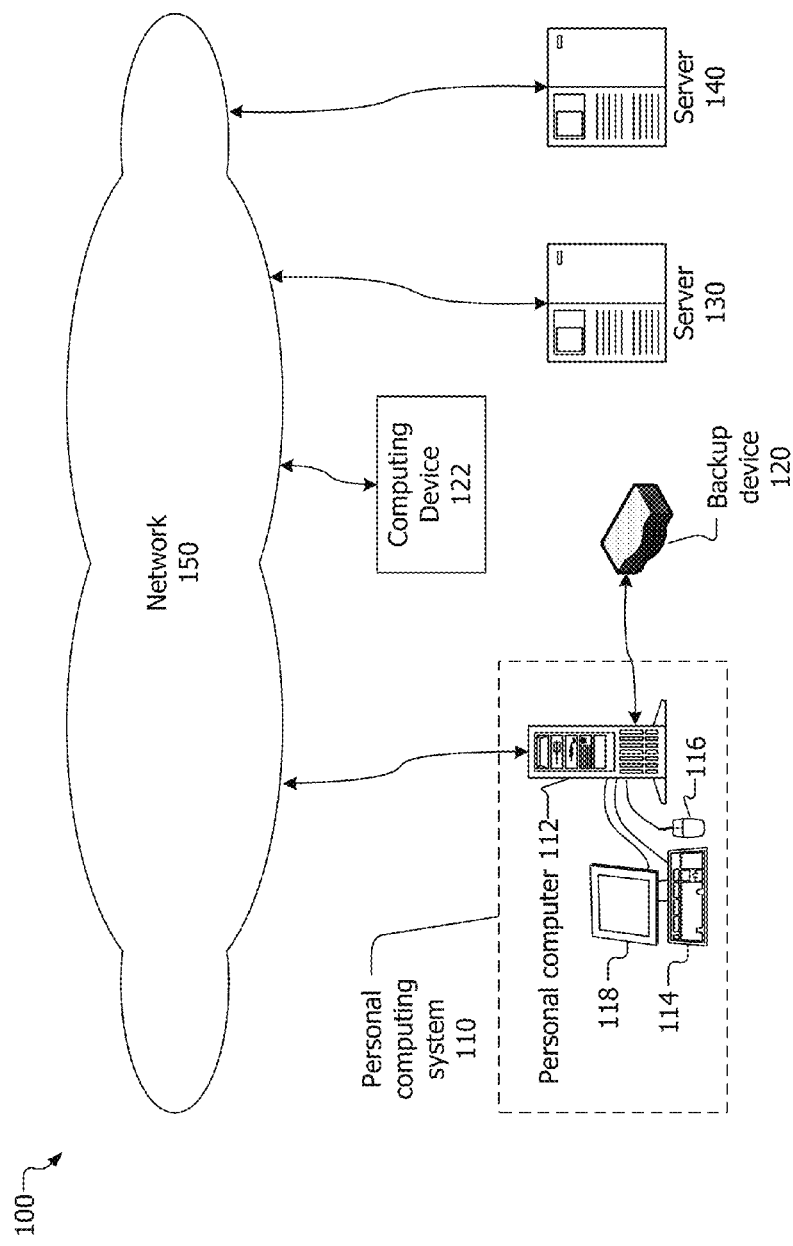
FIG. 1 is a block diagram of an environment in which backup and retrieval of files may be implemented.

The systems and methods described herein may be implemented in an environment 100 that includes the components shown in FIG. 1, namely a personal computer 112, a backup device 120, and servers 130 and 140. Although only one backup device 120 is shown and two servers 130 are shown, there may be none, one or multiple of each of backup devices 120 and servers 130 and 140. None, one or multiple backup devices may also be included in personal computer 112 of personal computing system 110. The servers 130 and 140 have single or multiple storage devices coupled thereto or included therein. Although shown as single servers, the servers 130 and 140 may be part of a group of servers and may be part of one or more public or private clouds. The servers 130 and 140 may be owned or controlled by a single entity, multiple related entities or multiple unrelated entities. For example, the servers 130 and 140 may be one or more of a user owned or controller Microsoft Windows server, a service provider or storage provider owned and controlled Microsoft Windows server, an Amazon Simple Storage Service (S3) server, a NovaStor server, a Box.net server, a FilesAnywhere server, a Microsoft Windows Azure server, and others. In addition, files may be backed up, stored and retrieved to and from other computers and computing devices coupled with the network which may be peers of computer 112.

The personal computing system 110 may include a personal computer 112, user input devices such as a keyboard 114, mouse 116, track ball, pen and tablet, and/or others, a display 118. The personal computer 112 also includes a processor, volatile memory (typically RAM); a primary storage device such as a hard disk drive (HDD) or a silicon storage device (SSD) on which an operating system (such as, for example, Microsoft Windows, Unix, Linux, Android, Chrome, Palm OS, Solaris, Symbian, and Apple Mac OS X), applications programs, data files (such as, for example, word processing files, video files, photograph files, and other files) and backup and retrieval software ("BRS") are stored, The personal computer 112 also includes a network interface card or network interface chip or chipset and related software that allows for communication over the network 150. Other components may be included in or coupled with the personal computer 112 to make up personal computing system 110.

The methods described herein may be implemented as a software application such as, for example, backup and retrieval software, BRS, stored on the primary storage device of the personal computer 112, delivered or available over the network 150 for download on a primary storage device, and/or provided on another storage medium or device, such as, for example, flash memory devices including cards, sticks and cartridges; and optical media such as CDs, DVDs and BLU-RAY DISKS®. The term backup and retrieval software and its acronym BRS are used herein to simplify the discussion of the claimed features. However, the backup and retrieval software and its acronym BRS includes software applications that may be used for storage of computer files for any purpose and may be used for synchronizing computer files between multiple computing devices and/or multiple storage devices.

The backup device 120 is a device that includes storage media that may be written to and read from by a computer. Example storage media include magnetic media such as tapes and hard disks, silicon based media including flash memory, and optical media such as CDs, CDs, DVDs and BLU-RAY DISKS®. Example backup devices 120 may be one of a variety of storage devices, including magnetic media devices such as hard disk drives (HDD) and tape drives; silicon storage devices (SSDs); flash memory devices including card, stick and cartridge readers and writers; and optical media devices such as CD, DVD and BLU-RAY DISK® drives and players. The backup device 120 may be connected to computer 112 wirelessly via BLUETOOTH, WIFI or other protocol and may be connected using a cable or wire via USB, IEEE 1394 (aka FIREWIRE and i.LINK), eSATA, or other protocol.

A network enabled backup device (not shown) may be coupled with network 150 or another personal computer or other computing device. The network enabled backup device may be in addition to or in place of backup device 120.

The network 150 may be the Internet. The network 150 may be a local area network (LAN), a wide area network (WAN), a storage area network (SAN), or a combination of these. The network 150 may be wired, wireless, or a combination of these. The network 150 may be comprised of numerous nodes providing numerous physical and logical paths for data units to travel. Each node may be a computing device as described below. Communications on the network 150 may take various forms, including frames, cells, datagrams, packets, messages, streams, higher level logical groupings, or other units of information, all of which may be referred to as packets.

The servers 130 and 140 may be used to store backup files and sets of files containing files from the personal computer 112. The server 130 may but need not include a backup server application ("BSA") that responds to or operates with the BRS included on the personal computer 112. The servers 130 and 140 may provide an application program interface or API that allows external programs to access features and files available on the servers 130. The BRS may access features, store files on and retrieve files from the servers 130 and 140 using the API provided by the particular server 130. For example, storage service providers like Amazon Simple Storage Service (S3), Box.net's OpenBox Platform and Microsoft Windows Azure publish their APIs to allow for programs to access the features offered by the storage service providers. These are only example storage service providers, other providers with other APIs are also within the scope of this disclosure. In addition, proprietary storage servers with well known or proprietary APIs may be the storage and backup destination and/or retrieval source. These proprietary systems may be developed within large companies that support their own in-house information technology or management information system group.

The personal computer 112 and servers 130 and 140 are considered computing devices. A computing device may include software for providing all or part of the functionality and features described herein in conjunction with storage devices. A computing device may include one or more of logic arrays, memories, analog circuits, digital circuits, software, firmware, and processors such as microprocessors, field programmable gate arrays (FPGAs), application specific integrated circuits (ASICs), read-only memory (ROMs), electronically erasable programmable read-only memory (PROMs), programmable logic devices (PLDs) and programmable logic arrays (PLAs). A computing device includes a network interface card or network interface chip or chipset and related software that allows for communication over the network 150. The processes, functionality and features of the BRS are embodied in instructions which operate on a computing device and may be an application program that may be augmented or enhanced by one or more applets (e.g., a Java applet), COM objects, linked libraries including dynamic linked libraries (DLLs) and statically linked libraries, scripts, subroutines, and operating system components or services. The BRS may be an application program and may be implemented as one or more scripts, extensions, plug-ins, add-ons or other grouping of software instructions that do not constitute an application program. For example, the BRS may be implemented as an extension, plug-in or add-on to an Internet browser, such as, for example, Mozilla Firefox and Google Chrome. The software and its functions may be distributed such that some components are performed by a computing device and others by other devices coupled with or included in the computing device or one or more other computing devices.

Although shown as a personal computer 112 in FIG. 1, the BRS and the methods incorporated therein may be implemented in other computing devices that include a processor, memory and a storage medium that may execute instructions including, but not limited to, personal computers, server computers, computing tablets, set-top boxes, cable boxes, video game systems, personal video recorders, video players including BLU-RAY DISC® players, cellular and other telephones, personal digital assistants (PDAs), tablet and slate computers, portable computers, and laptop computers. These computing devices may run an operating system, including, for example, variations of the Microsoft Windows, Linux, Unix, MS-DOS Palm OS, Solaris, Android, Chrome, Symbian, and Apple Mac OS X operating systems.

One or more other computing devices 122 may be coupled with network 150 and serve as storage destinations and backup retrieval devices. The computing device 122 may be considered a peer device with the personal computer 122 or other computing device that executes the BRS.

The techniques described herein are implemented by specialized software, the BRS, that executes on a computing device such as personal computer 112. The BRS may operate in conjunction with a BSA on an update server, depending on the embodiment.

The backup server application may be included in or otherwise stored on storage media included in, coupled with or otherwise accessible by the server 130. The backup server application may access a database stored on the backup server 130. The database may include information about sets or groups of files treated as an independent backup according to the date and time of the backup. The database may conform to a well known format or be proprietary, so long as an interface is provided for access by the backup server application. The database may be a simple table, be relational, be a structured query language (SQL) database, may be a Java Database and may be accessible via Open Database Connectivity (ODBC) or Java Database Connectivity (JDBC). Each database or file that identifies an update component includes at least the following information: original location of the backed up file, last modified date of the backed up file, and the size of the backed up file.

Additional and fewer units, modules or other arrangement of software, hardware and data structures may be used to achieve the processes and apparatuses described herein.

Figure 2:
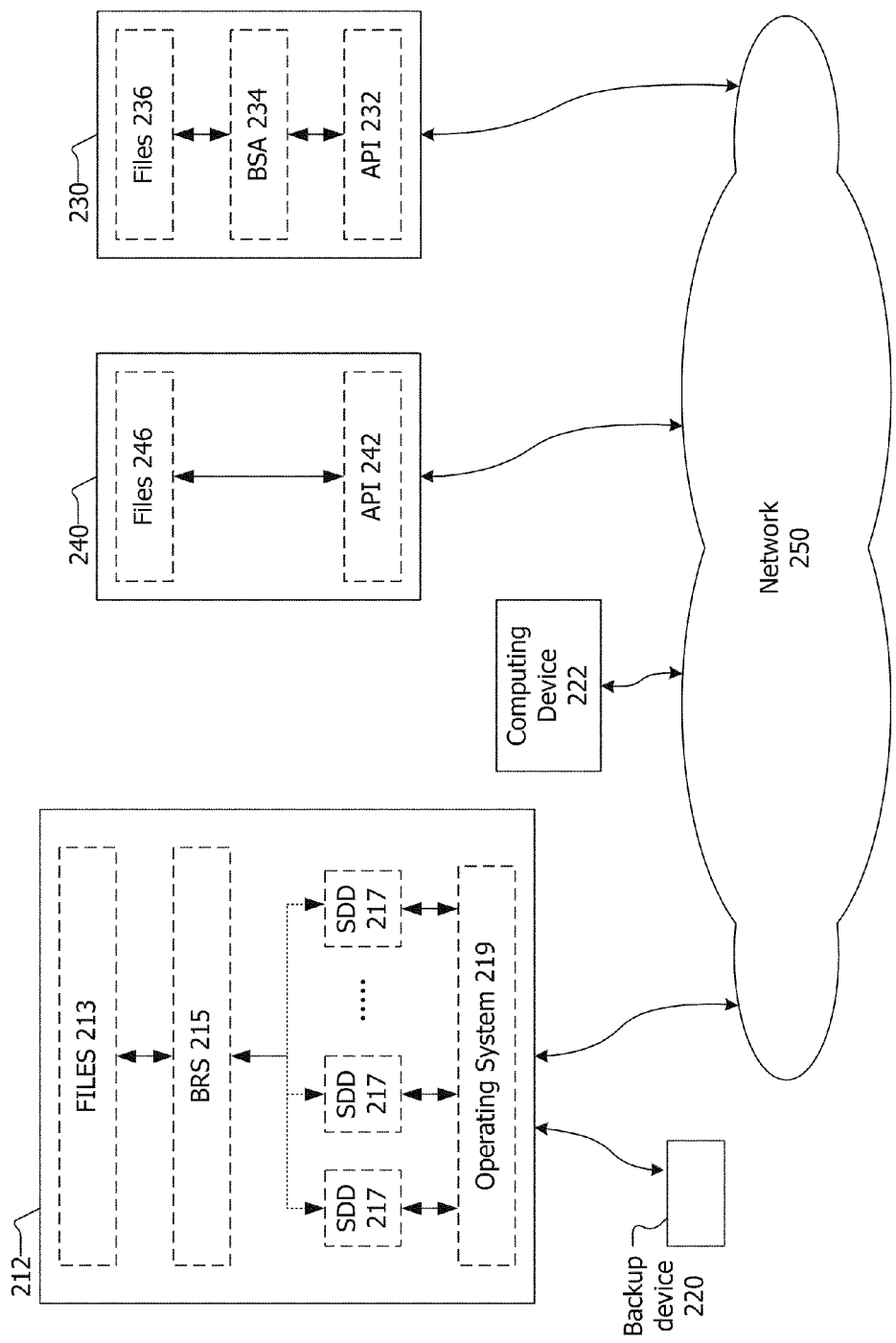
FIG. 2 is a conceptual block diagram of software used in an embodiment of a system to backup and retrieve files.

FIG. 2 is a conceptual block diagram of software used in an embodiment of a system to backup and retrieve files. A computer 212 or other computing device coupled with a network 250 may backup and retrieve files to and from servers 230 and 240. To allow a user to backup specified or identified files and to restore them from the backed up location, the BRS 215 provides a user interface. The BRS writes files 213 from the personal computer 212 to the backup device 220 directly coupled with the computer 212, and/or to one or more servers 230 and 240 over network 250 or to a peer computing device 222. To achieve the backup and retrieval described herein, the BRS 215 accesses and uses storage device drivers (SDDs) 217. There is an SDD 217 for each storage device, computing or server system or kind of device or system being used for storing copies of files 213. When BRS 215 is installed on personal computer 212, some SDDs 217 may be installed. Additional SDDs 217 may be added in response to a user request to access a particular server 230, 240 or a particular backup device 220 or computing device 222. Each SDD 217 allows the BRS 215 to communicate with and transfer files with backup devices 220, computing devices 222, clouds, and servers 230 and 240. The SDD 217 used supports and conforms to the file system of the backup device, server, system, or computing device. For example, if the backup device 220 is a hard disk drive (HDD) formatted according to the NTFS standard, then an SDD 217 that supports NTFS is provided and used. For example, if the server 240 on which the user elects to store files is an Amazon S3 server, then an SDD 217 that supports the Amazon S3 API is provided and used. These are two of many possible examples.

The SDD may be installed when the BRS 215 is installed, or the BRS 215 may download a needed SDD from a BRS provider website. For example, a user may perform daily backups on a local attached HDD and perform weekly backups to a first remove server. When after a year, the user decides to change servers to a second remote server hosted by a different company, when the user specifies the second server in the BRS, the BRS downloads and then accesses the SDD for the second server.

When a user accessing the BRS 215 selects files 213 to backup and specifies a backup server 230, the BRS 215 accesses an appropriate SDD 217 that conforms to the API 232 or 242 of the remote server 230 or 240. The BRS 215 sends the files to be backed up to one or more servers 230 and 240. The servers store the backed up files 236 and/or 246. When the server has a BSA 234, the API 232 of 234 may be incorporated in or be a separate component from the BSA 234. The serves 230 and 240 also execute an operating system, not shown.

Methods

Figure 3:
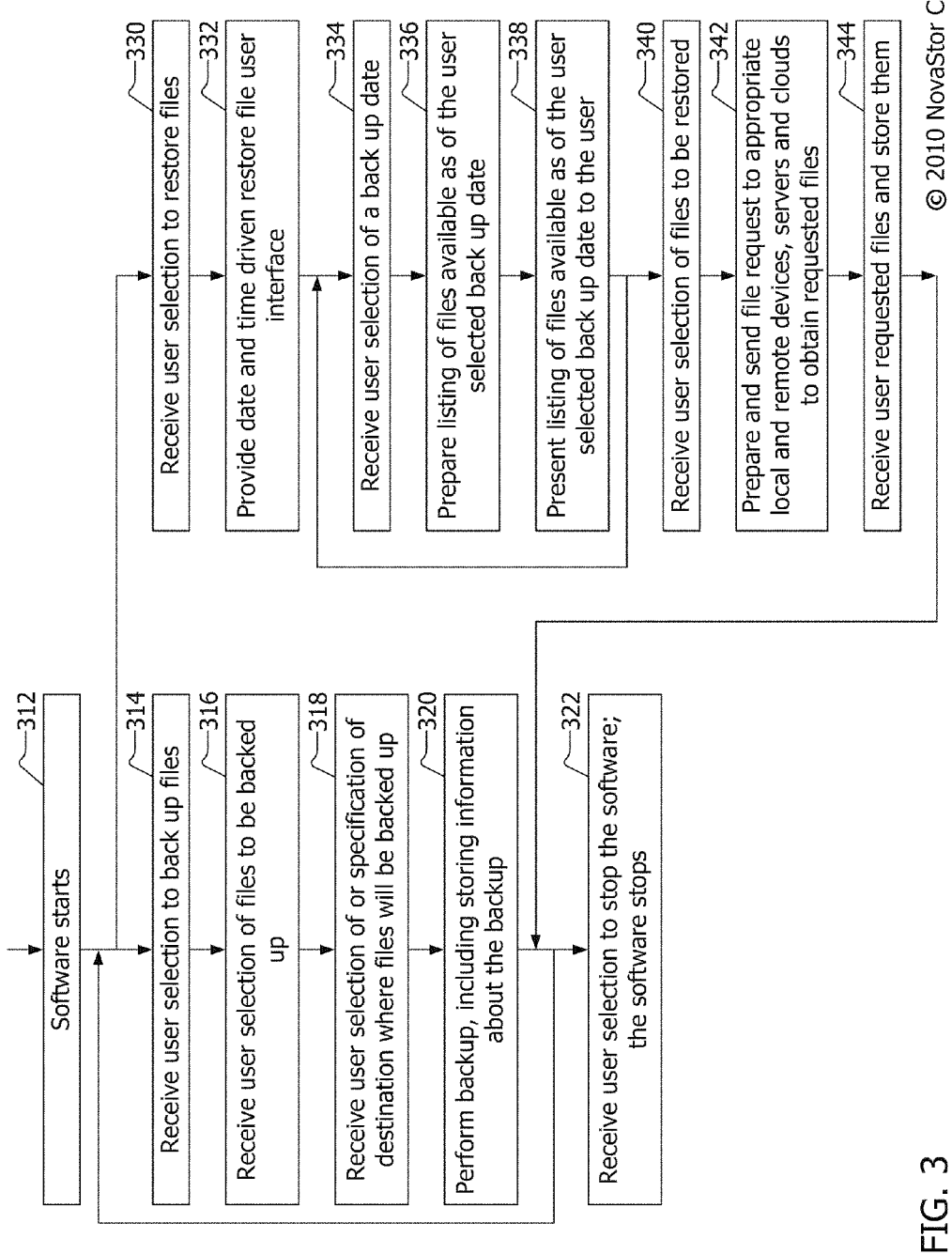
FIG. 3 is a flow chart of a first embodiment of actions taken to backup and retrieve files.

FIG. 3 is a flow chart of a first embodiment of actions taken to backup and retrieve files. The method presumes that software that implements the method has been installed on a computing device, such as a personal computer. The software may be in the form of an application program, namely a BRS application. In other embodiments, the method presumes that software such as an Internet browser extension, plug-in or add-on has been installed on a computing device. The software starts, typically in response to user activation by clicking or tapping on an icon or button or selecting the program, extension, plug-in or add-on from a menu, as shown in block 312. The software provides a user interface that allows a user to select to backup files, to restore files that were earlier backed up, among other things. The software receives a user selection to backup files, as shown in block 314. This is achieved by a user clicking or tapping on a graphic, icon, or via a pull-down menu provided by the software. The software receives user selection of files to be backed up, as shown in block 316. The software achieves this through the operating system interface to the computing device's storage devices, such as a hard disk drive or flash memory storage. The software receives a user selection of or specification of the destination where files will be backed up, as shown in block 318. This may be one or more local, attached storage devices, network attached storage (NAS) devices, local or remote computing devices, local servers or remote servers available over a local or wide area network, and a cloud or cloud devices. The software may provide a list of attached devices obtained from the operating system, may list available online backup services such as servers and clouds with which the user has an existing account or may provide a list available online backup services such as servers and clouds at which the user may create a new account. These destination locations may be provided graphically via icons, via a pull-down menu or using other user interface constructs. In addition, the software may allow a user to specify a website or storage provider name, a website address, or an IP address of a server or cloud that will be the destination of the files to be backed up.

In one embodiment, after the user selects or specifies the destination for the backup (in block 318), the software checks whether a storage device driver for the user selected or specified destination location is available on the computing device. When the storage device driver for the destination location is not available on the computing device, the software obtains the storage device driver for the destination location from a backup and restore server. The backup and restore server is a server provided by the provider of the BRS. The backup and restore server provides updates such as fixes and feature enhancements to the BRS and also provides needed or new storage device drivers to the BRS. In this way, the BRS need not be updated when a new storage provider makes a new cloud or server online storage service available. All that need be done is for the application or other software to download the storage device driver for the new cloud or server that will be used as or offered to a user as a destination location.

The software performs the backup of the user specified files to the user specified destination, including storing information about the backup, as shown in block 320. In one embodiment, the files are backed up to the destination; a unique identifier is created for the backup. The unique identifier may be a representation of the date and time of the backup or may be another unique identifier. The representation may be a decimal number derived from the date and time utility provided by the computing device's operating system. In one embodiment, for each backup performed at a particular time and date, an index file is prepared that contains information about the files backed up. The index file may be named according to the unique identifier. That is, a separate file is created each time a backup is performed, and the index file has a unique numerical name derived from the time and date the backup was performed. The index file may include a listing of files included in the particular backup including the entire path of the source or original file, the size of the file backed up, the last modified time of the file, the backup destination, and other additional backup and restore processing information. The content of the index file may be constructed using a markup language such as the extensible markup language or XML. Control information may be included in the index file or may be included in a separate control file having the same file name but a different extension. In one embodiment, each backup results in the BRS software creating a index file and corresponding control file. The control information includes a file level, a pointer to information in the index file, and may include addition backup and restore processing information.

Alternatively, the application or other software may maintain a database indexed according to the time and date of each backup. The database stores the same file information as the index file. The database may be included in the BRS or may be operate separately from the BRS. The database may conform to a well known format or be proprietary. When separate from the BRS, the database provides an interface for access by the BRS. The database may be relational, be a structured query language (SQL) database, may be a Java Database and may be accessible via Open Database Connectivity (ODBC) or Java Database Connectivity (JDBC).

At this point, the user may elect to close the application or stop the software. The application receives a user selection to stop the software, and the software stops, as shown in block 322.

When after the software starts and the user elects to restore backed up files, the software receives a user selection to restore files, as shown in block 330. This is achieved by a user clicking or tapping on a graphic, icon, or via a pull-down menu provided by the software. The software provides a date and time driven restore file user interface, as shown in block 332. To provide the date and time driven user interface, in one embodiment the BRS refers to either its database to obtain all dates and times of all backups, or the BRS refers to the pairings of index and control files for each backup. The BRS populates the date and time user interface with the dates and times for all backups as obtained from the database or from the index and control files.

The software receives user selection of a backup date, as shown in block 334 The software prepares a listing of files available as of the user selected backup date, as shown in block 336. The software presents the listing of files available as of the user selected backup date to the user, as shown in block 338. The files may be available from multiple locations.

The date and time driven restore interface may be implemented by the software providing a horizontal slider graphical construct, a vertical slider graphical construct, a twistable knob graphical construct, or other user adjustable or movable graphical representation. For any of these, when the slider or knob is moved, the date and time progresses backward or forward. Concurrent with movement of the slider, knob or other user interface construct, the files available for retrieval and restore may change. When the slider, knob or other user interface construct, is moved, the date changes and the files available and presented to the user change, and the method loops between the actions recited in blocks 334, 336, and 338. In one embodiment, the software receives user selection of a backup date, as shown in block 334, when the using stops moving the slider, knob or other user interface construct. When the slider, knob or other user interface construct ceases movement, the current date is selected (block 334). A date and time driven restore interface is depicted in FIGS. 4, 5 and 6.

Figure 4:
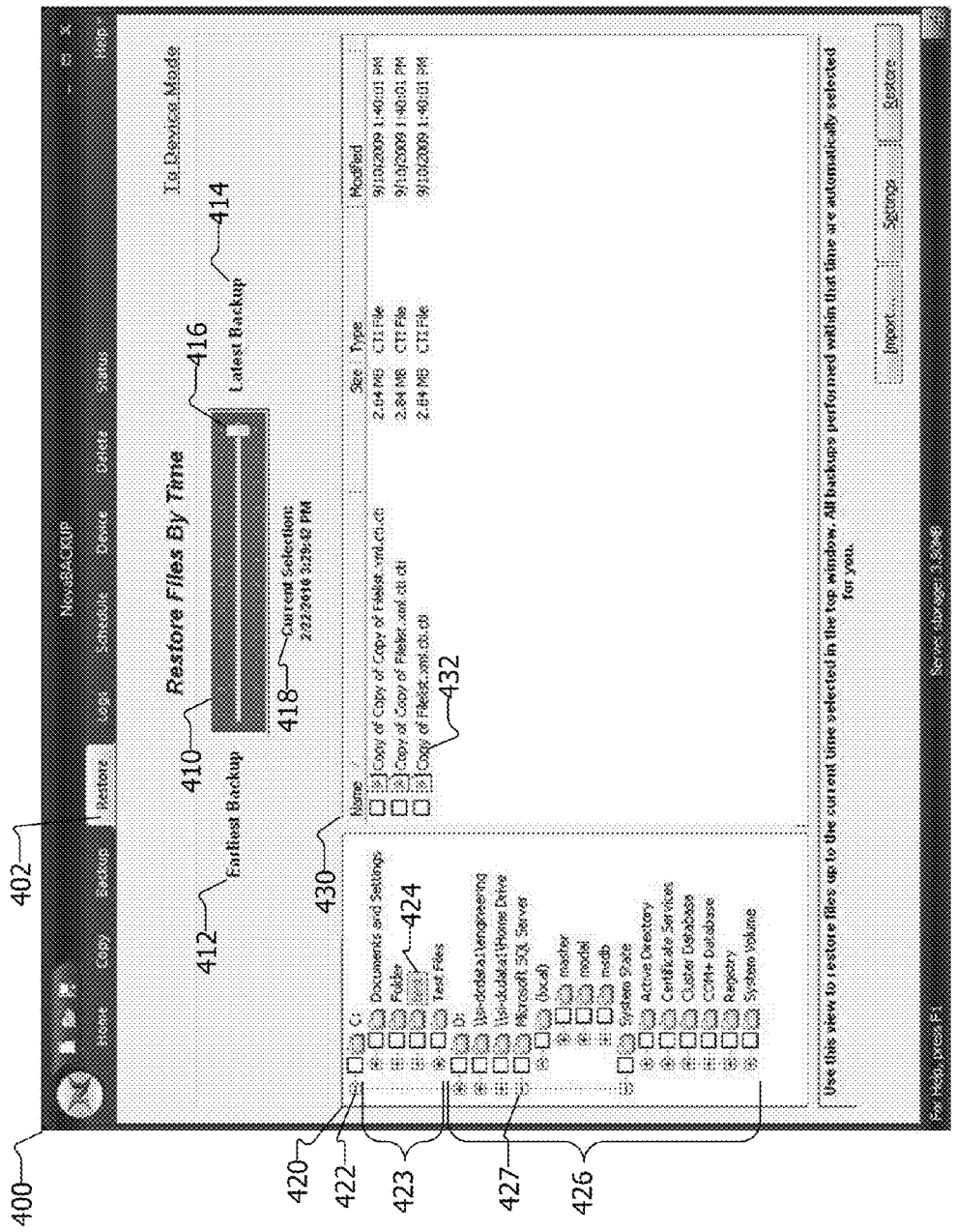
FIG. 4 is a first screen shot of a file selection user interface that allows a user to select backed up files to be retrieved.
Figure 5:
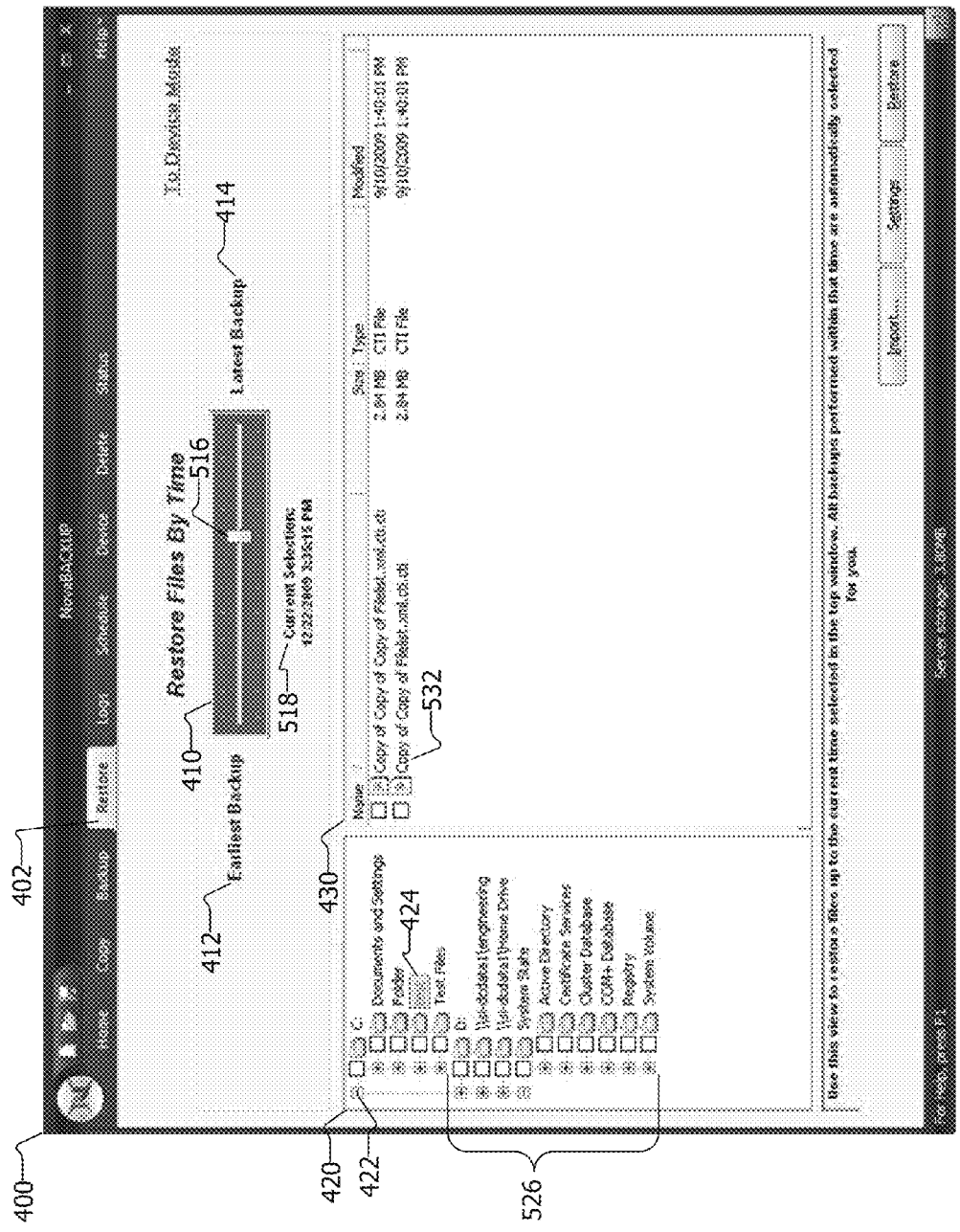
FIG. 5 is a second screen shot of a file selection user interface that allows a user to select backed up files to be retrieved.
Figure 6:
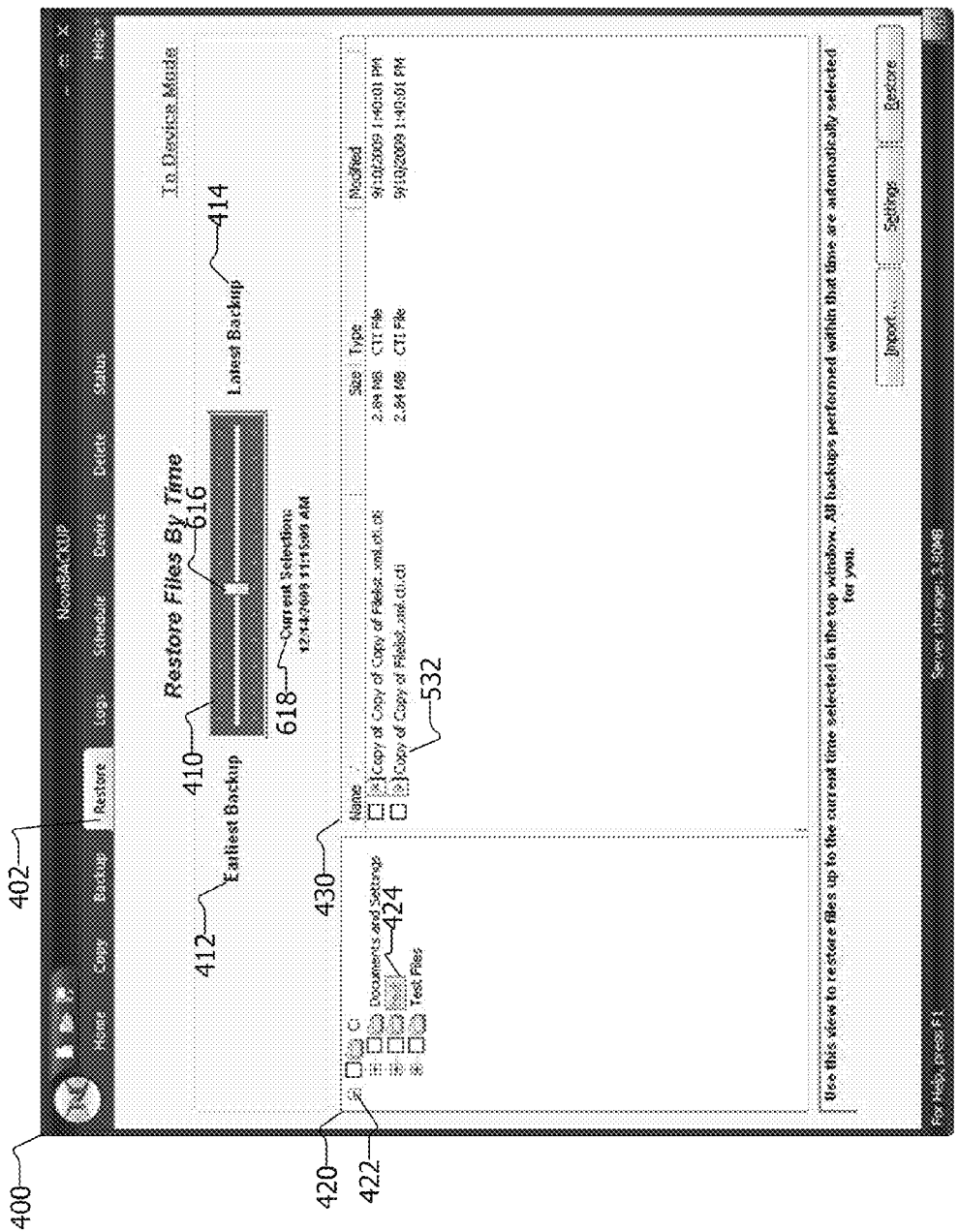
FIG. 6 is a third screen shot of a file selection user interface that allows a user to select backed up files to be retrieved.

FIGS. 4, 5 and 6 are screen shots of a file selection user interface that allows a user to select backed up files to be retrieved according to the date and time of a backup. Referring to FIGS. 4, 5 and 6, when the user selects the restore tab 402 on the user interface, a pane with horizontal slider 410 may be provided to the user. The slider 410 allows the user to select the date and time of a stored backup by adjusting or moving the button 416 on the slider horizontally as shown by the location of buttons 416, 516 and 616 in FIGS. 4, 5 and 6. The slider spans from the earliest or oldest backup 412 to the latest or most recent backup 414. When the slider button 416 is stopped at or traverses over a particular location on the slider 410, a date and time corresponding to the current selection 418, 518 and 618 is provided under the slider 410. In other embodiments, the horizontal slider may be replaced with a user adjustable, movable or selectable graphic including, for example, a twistable knob, a vertical slider, a graphical representation of stairs, a graphical representation of a ladder, a three-dimensional cube or other user interface construct that allows a user to navigate between earliest and latest backup times and dates including backup times and dates in between. In other embodiments, the user interface used to provide the available backup dates and times may be check boxes or radio buttons with corresponding text that lists the date and time of available backed up or stored files.

In one embodiment, when the slider 410 is moved by the user, a list of available folders is prepared and presented in a folder pane 420. In one embodiment, the available folders refer to the original location of the folder and not the backup location of the files. Referring to FIG. 4, in this example, the C: drive is shown with its subfolders 423 as the open/close box 422 is selected as opened as shown by the minus sign. As is well known, an open/close box with a plus opens the associated folder when the plus is selected and closes the listing of the contents of the folder when the minus is selected. In this way, a minus signifies that the folder contents are listed and the folder's contents are open for viewing, and a plus signifies that the folder is closed such that the contents of the folder are not shown.

When a user selects a folder, such as test 424, the files in that folder that were backed up are provided in a file pane 430. In this example, three files 432 are shown to be in the test folder 424. Other source or original locations (devices) 426 are listed in the available folder pane 420. As listed, these include a local device D:, two network devices, a Microsoft SQL server 427, and a system state. The system state refers to one or more of an active directory, a registry, a COM database, certificate services, a cluster database, system volume information, and other files pertinent to the operating system of the computing device.

Referring to FIGS. 4, 5 and 6, when the slider 410 is moved from position 416 to 516 and to 616, the date and time shown as the current selection 418, 518 and 618 changes to reflect the date and time of the currently selected backup. Concurrently with the changing of the time and date current selection 418, 518 and 618, when the slider 410 is moved from position 416 to 516 and to 616, the contents of the folder pane 420 change. Similarly, in this example, when the slider 410 is moved from position 416 to 516 and the folder 424 remains selected, the number of backed up files 432 and 532 available for retrieval changes from three to two. Many more backed up files may be available and shown depending on the number of files backed up by the user. Importantly, the location of the backed up files may be hidden from the user. This may be done so that all the user be concerned with is the date of the backed up files and where they were originally located on the user's computer or in the user's computing environment. File pane 430 does not immediately show where the available backed up files 432 and 532 are located. However, in other embodiments, the backup location for the files may be provided to the user with the file name, or it may be provided to the user in response to a mouse over the backed up file name, or via a menu that appears when a user right clicks on the mouse or single taps when over the backed up file name. The files may be available from multiple backup or storage locations.

In one embodiment, the software may provide information about the backed up files 432 and 532 to the user when the user mouses over the file names; or the software may provide the user the option to view information about the backed up files by right clicking a mouse over or single tapping the file names. The information provided may include the backed up location of the file, such as the name of a disk, the name of a server, the name of a storage provider, etc.

Returning to a discussion of FIG. 3, to prepare a listing of files available as of the backup date and presents the listing of files available as of the backup date to the user, as shown in blocks 336 and 338, in one embodiment the BRS refers to either its database or the pairings of index and control files for each backup. When referring to the database, information about all level 0 or root levels for files stored at the particular date and time is retrieved and initially presented in the folder pane 420. Information about the root level of the original files backed up may be retrieved from the index file based on entries in the control file for the user selected date and time. When an open/close box in the folder pane is opened, additional queries are made to the database or additional information is obtained from the index file according to the level of the folder opened in the folder pane 420.

In one embodiment, the backing up of files is performed with limited computational demands while there is some additional computational overhead in preparing a list of files available as of a certain date. In this embodiment, the number of backups that include the user selected file are identified. This is achieved by analyzing the backed up file information in reverse order, starting from the latest backup and proceeding to the earliest backup. In this way, when a user selects a particular date, a restore of the file or files from the most recent to the oldest is attempted. This makes for more simple backup and a more complex restore.

In another embodiment, the backing up of files is performed with more computational demands while there is little computational overhead in preparing the files available as of a certain date. In this embodiment, whenever a backup is performed, the database, index file, or other tracking scheme is updated for each file backed up to keep a current listing of the latest version of the file, including keeping a date ordered listing of the backed up files. In this way, preparing a list of files available as of a particular date is relatively simple and requires little computation, while there is additional or more computation and actions performed during the back up process.

Returning to a discussion of FIG. 3, after the user selects a date and time and is presented with available files that were backed up as of the user selected date and time (as shown in blocks 334, 336 and 338), the software receives user selection of files to be restored, as shown in block 340. The user selection may be received by, in various embodiments, recognizing which files have boxes checked (see 432 and 532 of FIGS. 4, 5 and 6), highlighted, or otherwise designated. The software prepares and sends one or more file requests to appropriate local and/or remote devices, servers and clouds to obtain requested files, as shown in block 342. The software allows a user to restore or retrieve files from multiple storage devices, computing devices, servers, and clouds without the user having to select from which location the selected files are to be retrieved or restored. The software communicates with the various sources of the user selected files using the API or other interface provided by the storage devices, computing devices, servers and clouds. The software may access one or more appropriate storage device drivers (SDDs) to access the one or more local and remote storage devices, computing devices, servers and/or clouds on which the user selected files are stored. The software requests the user selected backed up files from the appropriate source, be it an attached drive, local or remote server, or cloud, or a combination.

The software then receives the user requested files and stores them, as shown in block 344. The software receives the requested user selected backed up files from one or more sources, that is, one or more attached drives or storage devices, local or remote servers, local or remote storage devices, local or remote computing devices, and/or clouds. The software typically stores the files on the primary storage device of the computing device on which the software is running. This is typically a hard disk drive, but may be other storage devices, including SSDs and flash memory.

Figure 7:
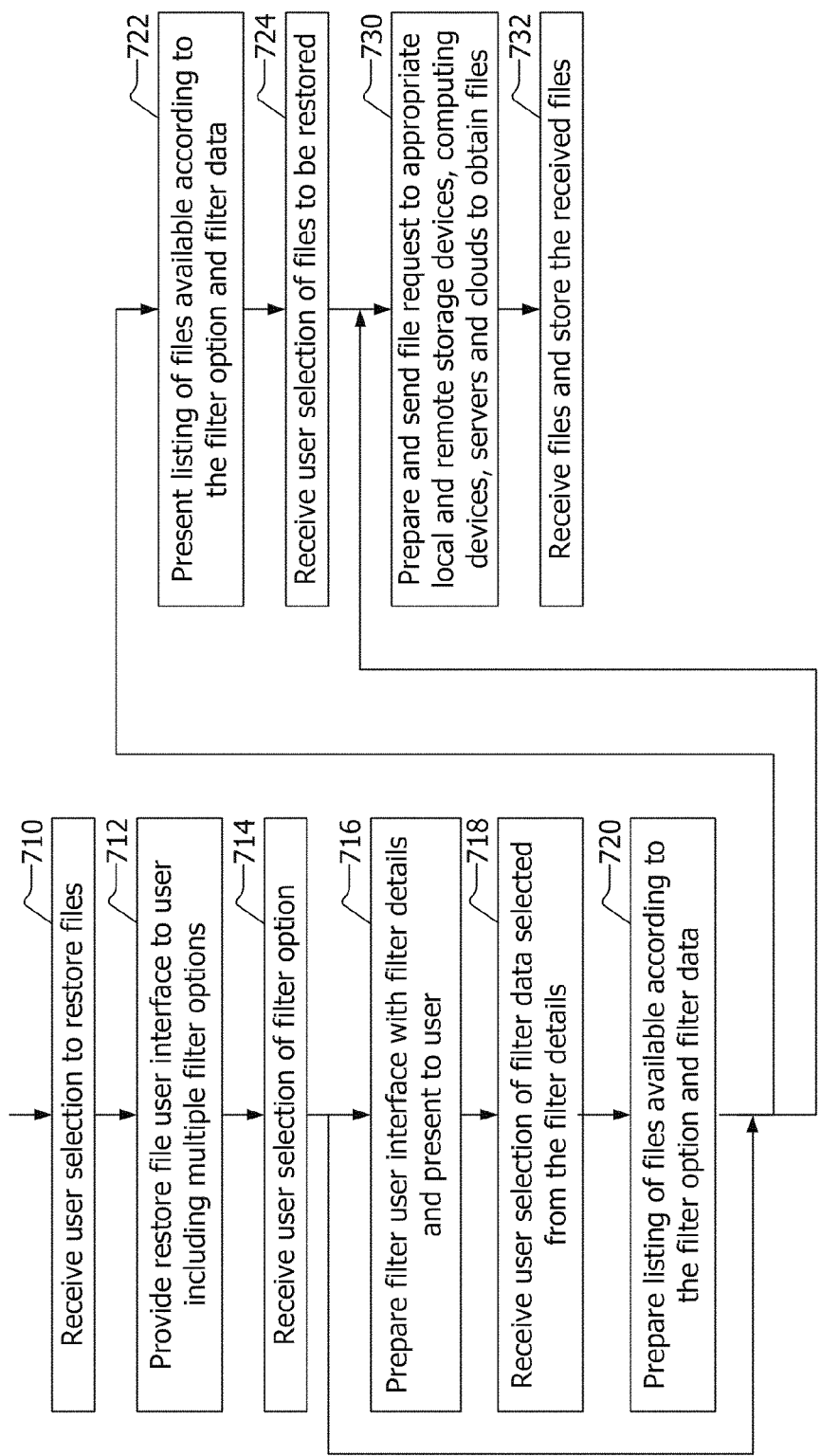
FIG. 7 is a flow chart of a second embodiment of actions taken to backup and retrieve files.

Referring now to FIG. 7, there is shown a flow chart of a second embodiment of actions taken by a computing device to retrieve files. The method is performed by software and presumes that software such as an application program, Internet browser extension, plug-in or add-on has been installed on the computing device. The method presumes that files have been stored according to steps 312 through 320 described above regarding FIG. 3 or similar actions on one or more local attached storage devices, network attached storage (NAS) devices, local and/or remote computing devices available over a local or wide area network, and local and/or remote servers available over a local or wide area network, which may be a cloud or cloud device.

The software receives a user selection to restore files, as shown in block 710. This is achieved by, for example, a user clicking or tapping on a graphic, icon, or via a pull-down menu provided by the software. The software provides a restore file user interface including multiple filter options, as shown in block 712. The term filter is used to refer to selection criteria which may be data, information or meta data about stored files or groups of files. The filter options allow a user to select which set or groups of files to locate on local and remote devices for retrieval. The filter options provided may include location, such as, for example, a specific server, cloud, device, IP address, storage provider, etc.; date and time (as described above regarding FIGS. 3, 4, 5 and 6); file type, such as, for example, photos, registry files, videos, databases, etc.; content type which may be based on meta data, that is, data about the files, such as, for example, all files regarding a certain name, place, subject, etc.; specific content, such as key words, character strings, alphanumeric strings or numbers included in a file; tags and similar descriptive data associated with the file; file size; creator, owner, and/or editor of file; and attributes, such as, for example, read only, archive, hidden, etc. The software receives user selection of filter options, as shown in block 714.

The software prepares a filter user interface with filter details and presents the user interface to the user, as shown in block 716. The user interface allows the user to select from one or more different values for the selected filter option. One example is the filter based on time and date represented as a slider or other graphical element described above regarding blocks 330-340 of FIG. 3 and in FIGS. 4, 5 and 6. The software provides a user interface that allows the user to select values of filter data from filter details for the particular filter option selected. In another example, if the filter option selected is file size, a user interface with filter detail increments at 1, 3, 5, 7 and 10 MBytes may be provided with the numbers referring to files not smaller then those values. The filter detail values in the scale may be computed by the software according to the numbers of files having certain sizes or may be preset by the software. In another example, if the filter option selected is author, a user interface with names of various file authors as filter details may be provided. The software obtains the filter detail author names from a stored file data base, from index files, or from other files maintained by the software to track information and/or meta-data about the stored files. In another example, if the filter option selected is file type, a user interface allowing a user to select filter details from read-only, archive, hidden and other attributes may be provided. In each of these examples, the user interface may be a user adjustable or movable slider, a knob, a three-dimensional cube, a series of check boxes with corresponding text for each of the values, or other user interface design that allows the user to easily and readily select the desired value of values for the filter option.

The software receives user selection of filter data selected from the filter details, as shown in block 718. This is achieved by the software recognizing a mouse click or finger tap on the user interface, the user dragging and releasing a graphical slider or knob, the user filling in check boxes or radio buttons, etc. depending on the implementation of the user interface. The software then prepares a list of files available according to the filter option and filter data selected by the user, as shown in block 720.

Depending on the embodiment, the flow of actions continues at either block 722 or block 730. In one embodiment, the software presents a listing of files available according to the user selected filter option and filter data, as shown in block 722. Importantly, the files may be available from multiple backup or storage locations, and the location of the available files may be hidden from the user. This may be done so that all the user be concerned with is the filter data concerning the available files and where the file were originally located on the user's computer or in the user's computing environment.

A backup or storage location of the available files may be provided to the user in response to a mouse over the backed up file name, or via a menu that appears when a user right clicks on the mouse or single taps when over the backed up file name.

The software then receives user selection of the files to be restored, as shown in block 724. The software accesses information stored about the selected files during the backup process from index files/control files or from a database maintained by the software, depending on the embodiment. The information includes the location of the user selected files, for example, for each file, one (or more if a file is split between two or more locations) specific local attached storage device, network attached storage (NAS) device, local or remote computing device or server, or local or remote clouds or cloud devices. The files may be available from multiple locations. The software prepares and sends file requests to appropriate local and remote storage devices, computing devices, servers and clouds to obtain the user selected files, as shown in block 730. The software allows a user to restore or retrieve files from multiple storage devices, computing devices, servers, and clouds without the user having to select from which location the selected files are to be retrieved or restored. The software communicates with the various sources of the user selected files using the API or other interface provided by the storage devices, computing devices, servers and clouds. The software may access one or more appropriate storage device drivers (SDDs) to access the one or more local and remote storage devices, computing devices, servers and/or clouds on which the user selected files are stored. The software requests the user selected files from the appropriate source, be it an attached drive, a local or remote device or server, cloud, or a combination of these.

The software receives the requested files and stores them, as shown in block 732. In some circumstances, sets or groups of files or files themselves may be distributed in two or more locations. In these circumstances, the software also rebuilds or reassembles the set or groups of files or the files themselves as needed. The software typically stores the files on the primary storage device of the computing device on which the software is running. This is typically a hard disk drive, but may be other storage devices, including SSDs and flash memory.

In one embodiment, after receiving the user selected filter option and filter data (blocks 714 and 718) and after preparing a listing of files available according to the filter option and filter data selected by the user (block 720), the software automatically selects a preselected subset or all of the stored files that correspond to the selected filter option and selected filter data. The software then sends a request for the files to and receives the requested files from one or more local and/or remote storage devices, computing devices, servers and clouds (blocks 730 and 732).

In one embodiment, the actions recited in steps 716, 718 and 720 are skipped. In this embodiment, the files retrieved are designated solely by the user selected filter option. For example, the software may provide the user to retrieve all files greater than 5 Mbytes, all image files, all video, all music, all system files, etc. If the user selects one of these filter options, no additional information is needed from the user, and the flow of actions continues to either block 722 or block 730.

In another embodiment, the software may be included in a storage device such as NAS device, a standalone HDD or SSD, or a USB connected thumb drive. In these embodiments, the method described in FIG. 7 can be started via a physical button on the storage device or be automatically started when the storage device is connected with a computing device, such as, for example, a cellular phone or personal computer. In one version of this embodiment, the user does not select the date and/or the files as the most recent group of stored or backed up files is automatically chosen by the software.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. A storage medium having instructions stored thereon which when executed by a processor in a computing device cause the computing device to perform actions comprising:

executing a backup and restore software in response to a user action the backup and restore software providing a time based interface including a time-selection element that allows a user to select a time from a plurality of available backup times of a plurality of already backed up files, wherein interaction with the time-selection element causes an update of a display of an original location folder list and a display of a file list including the plurality of backed up files such that only those files of the plurality of backed up files that were present in the file list at the time indicated by the time-selection element are displayed, the plurality of backed up files stored on two or more selected from the group including a local backup device, a local server, a remote server, a remote cloud, and wherein the original location folder list includes only those folders that were an original location of the already backed up files displayed in the file list at the time indicated by the time-selection element the backup and restore software receiving a user selection of user selected backed up files to be retrieved based on the user selected backed up files to be retrieved, the backup and restore software accessing one or more appropriate storage device drivers of a plurality of storage device drivers to communicate with one or more sources of the user selected backed up files, each storage device driver of the plurality of software device drivers corresponding to a particular one of the sources of the user selected backed up files the backup and restore software sending a file retrieval request to the one or more sources of the user selected backed up files the backup and restore software receiving and storing the user selected backed up files on a primary storage device included in the computing device.

2. The storage medium of claim 1 wherein the backup and restore software providing a time based interface is achieved using one of a horizontal slider graphical construct, a vertical slider graphical construct, a three dimensional cube graphical construct, and a twistable knob graphical construct.

3. The storage medium of claim 1 wherein the computing device is one of a personal computer, a cellular telephone, a computing tablet, a notebook computer, a game console, and a BLU-RAY DISC® player.

4. The storage medium of claim 1 wherein the storage medium is one of a hard disk, a magnetic tape, a flash memory card, a flash memory stick, a silicon storage medium, a CD a DVD, and a BLU-RAY DISC®.

5. The storage medium of claim 1 having further instructions stored thereon which when executed by the processor in the computing device cause the computing device to perform further actions comprising:

the backup and restore software receiving a user selection to backup files the backup and restore software receiving user selection of user selected files to be backed up the backup and restore software receiving user selection of a destination location for the user selected files to be backed up the backup and restore software receiving user selection to execute a backup of the user selected files to be backed up to the destination location the backup and restore software initiating transfer of the user selected files to be backed up to the destination location, the backup and restore software using an appropriate storage device driver for the destination location to perform the transfer of the user selected files to be backed up to the destination location.

6. The storage medium of claim 3 having further instructions stored thereon which when executed by the processor in the computing device cause the computing device to perform further actions comprising:

the backup and restore software maintaining a database of information about backed up file and backups performed.

7. The storage medium of claim 3 having further instructions stored thereon which when executed by the processor in the computing device cause the computing device to perform further actions comprising:

the backup and restore software creating an index file and a control file for each backup performed.

8. The storage medium of claim 6 having further instructions stored thereon which when executed by the processor in the computing device cause the computing device to perform further actions comprising:

the backup and restore software accessing the index file and the control file to prepare the time based interface.

9. The storage medium of claim 3 having further instructions stored thereon which when executed by the processor in the computing device cause the computing device to perform further actions comprising:

after receiving user selection of a destination location for the user selected files to be backed up, the backup and restore software checking whether the storage device driver for the destination locations is available on the computing device when the storage device driver for the destination location is not available on the computing device, the backup and restore software obtaining the storage device driver for the destination location from a backup and restore server.

10. A storage medium having instructions stored thereon which when executed by a processor in a computing device cause the computing device to perform actions comprising:

executing software in response to a user action the software providing a restore file interface allowing a user to restore a plurality of files based on a plurality of filter options, the filter options including a time-selection element that allows a user to select a time from a plurality of available backup times of a plurality of already backed up files, wherein interaction with the time-selection element causes an update of a display of an original location folder list and a display of a file list including the plurality of files such that only those files of the plurality of files that were present in the file list at the time indicated by the time-selection element are displayed, the files stored on at least two selected from the group including a local device, a local server, a remote server, a local computing device, a remote computing device, a remote cloud, and wherein the original location folder list includes only those folders that were an original location of the already backed up files displayed in the file list at the time indicated by the time-selection element the software receiving a filter option selection from the user via the restore file interface the software preparing an available file list based on the filter option selection the software presenting the available file list to the user the software receiving a user selection of user selected files from the available file list, the user selection of user selected files to be retrieved by the software based on the user selected files to be retrieved, the software accessing one or more appropriate storage device drivers of a plurality of storage device drivers to communicate with one or more sources of the user selected files, each of the plurality of storage device drivers corresponding to a particular one of the sources of the user selected files the software sending a file retrieval request to the one or more sources of the user selected files the software receiving and storing the user selected files on a primary storage device included in the computing device.

11. The storage medium of claim 10 wherein the filter options include at least two selected from the group including a location, a date/time, a file type, a content type, a file size, a file creator, a file owner, a file editor, and file attributes.

12. The storage medium of claim 10 wherein the software is one selected from the group including an application program, a JAVA applet or program, and an Internet browser extension, add-on or plug-in.

13. The storage medium of claim 10 having further instructions stored thereon which when executed by the processor in the computing device cause the computing device to perform further actions comprising:

the software preparing a filter interface including a plurality of filter detail preferences based on the filter option selection the software receiving filter details from the user via the filter interface wherein the available file list is additionally based on the filter details received from the user.

14. The storage medium of claim 10 wherein the filter interface is one of a horizontal slider graphical construct, a vertical slider graphical construct, a three-dimensional cube, check boxes with descriptive text, radio buttons with the descriptive text, and a twistable knob graphical construct.

15. The storage medium of claim 10 wherein the filter interface is user adjustable such that the filter detail preferences change as the user adjusts the filter interface.

16. The storage medium of claim 15 wherein the filter interface is one of a horizontal slider graphical construct, a vertical slider graphical construct, a three-dimensional cube, and a twistable knob graphical construct.

17. The storage medium of claim 10 wherein the computing device is one of a personal computer, a cellular telephone, a computing tablet, a notebook computer, a set-top box, a game console, and a BLU-RAY DISC® player.

18. The storage medium of claim 10 wherein the storage medium is one of a hard disk, a magnetic tape, a flash memory card, a flash memory stick, a silicon storage medium, a CD a DVD, and a BLU-RAY DISC®.

19. The storage medium of claim 10 having further instructions stored thereon which when executed by the processor in the computing device cause the computing device to perform further actions comprising:

the software receiving a user selection to backup files the software receiving user selection of user selected files to be backed up the software receiving user selection of a destination location for the user selected files to be backed up the software receiving user selection to execute a backup of the user selected files to be backed up to the destination location the software initiating transfer of the user selected files to be backed up to the destination location, the software using an appropriate storage device driver for the destination location to perform the transfer of the user selected files to be backed up to the destination location.

20. The storage medium of claim 19 having further instructions stored thereon which when executed by the processor in the computing device cause the computing device to perform further actions comprising:

the software maintaining a database of information about backed up file and backups performed.

21. The storage medium of claim 19 having further instructions stored thereon which when executed by the processor in the computing device cause the computing device to perform further actions comprising:

the software creating an index file and a control file for each backup performed.

22. The storage medium of claim 21 having further instructions stored thereon which when executed by the processor in the computing device cause the computing device to perform further actions comprising:

the software accessing the index file and the control file to prepare the filter interface.

23. The storage medium of claim 19 having further instructions stored thereon which when executed by the processor in the computing device cause the computing device to perform further actions comprising:

after receiving user selection of a destination location for the user selected files to be backed up, the software checking whether the storage device driver for the destination locations is available on the computing device when the storage device driver for the destination location is not available on the computing device, the software obtaining over a network the storage device driver for the destination location from a backup and restore server.

24. A storage medium having software stored thereon which when executed by a processor in a computing device causes the computing device to perform actions comprising:

providing a restore file interface allowing a user to restore a plurality of files based on a plurality of filter options, the filter options including a time-selection element that allows a user to select a time from a plurality of available backup times of a plurality of already backed up files, wherein interaction with the time-selection element causes an update of a display of an original location folder list and a display of a file list including the plurality of files such that only those files of the plurality of files that were present in the file list at the time indicated by the time-selection element are displayed, the files stored on at least one selected from the group including a local device, a local server, a remote server, a local computing device, a remote computing device, a remote cloud, and wherein the original location folder list includes only those folders that were an original location of the already backed up files displayed in the file list at the time indicated by the time-selection element receiving a filter option selection from the user via the restore file interface preparing a filter interface including a plurality of filter detail preferences based on the filter option selection receiving filter details from the user via the filter interface preparing an available file list based on the filter option selection and the filter details received from the user presenting the available file list to the user receiving a user selection of user selected files from the available file list, the user selection of user selected files to be retrieved by the software based on the user selected files to be retrieved, accessing one or more appropriate storage device drivers of a plurality of storage device drivers to communicate with one or more sources of the user selected files, each of the plurality of storage device drivers corresponding to a particular one of the sources of the user selected files sending a file retrieval request to the one or more sources of the user selected files receiving and storing the user selected files on a primary storage device included in the computing device.

25. The storage medium of claim 24 wherein the filter interface is achieved using one of a horizontal slider graphical construct, a vertical slider graphical construct, a three-dimensional cube, check boxes with descriptive text, radio buttons with the descriptive text, and a twistable knob graphical construct.

26. The storage medium of claim 24 wherein the filter interface is user adjustable such that the filter detail preferences change as the user adjusts the filter interface.

27. The storage medium of claim 24 wherein the filter interface is one of a horizontal slider graphical construct, a vertical slider graphical construct, a three-dimensional cube, and a twistable knob graphical construct.

28. The storage medium of claim 24 wherein the computing device is one of a personal computer, a cellular telephone, a computing tablet, a notebook computer, a set-top box, a game console, and a BLU-RAY DISC® player.

29. The storage medium of claim 24 wherein the storage medium is one of a hard disk, a magnetic tape, a flash memory card, a flash memory stick, a silicon storage medium, a CD a DVD, and a BLU-RAY DISC®.

\* \* \* \* \*